US012626724B2

(12) United States Patent
Bodinet et al.

(10) Patent No.: US 12,626,724 B2
(45) Date of Patent: May 12, 2026

(54) COHERENT SLOW-MOTION VIDEO DISPLAYED ACROSS MULTIPLE DEVICES

(71) Applicant: Adobe Inc., San Jose, CA (US)

(72) Inventors: Joshua Bodinet, San Diego, CA (US); Ulaganathan Sriramulu, San Jose, CA (US); Abhishek Kumar Singh, San Jose, CA (US); Cheung Ng, Daly City, CA (US)

(73) Assignee: Adobe Inc., San Jose, CA (US)

( * ) Notice: Subject to any disclaimer, the term of this patent is extended or adjusted under 35 U.S.C. 154(b) by 81 days.

(21) Appl. No.: 18/328,491

(22) Filed: Jun. 2, 2023

(65) Prior Publication Data
US 2024/0404558 A1 Dec. 5, 2024

(51) Int. Cl.
*G11B 27/00* (2006.01)
(52) U.S. Cl.
CPC .................................. *G11B 27/005* (2013.01)
(58) Field of Classification Search
CPC ........ G11B 27/005; G11B 2020/10981; G11B 2020/1099; H04N 5/783; H04N 21/44008; H04N 21/47217; H04N 1/32773; H04N 21/2625; H04N 21/472

USPC .......................................................... 386/343
See application file for complete search history.

(56) References Cited

U.S. PATENT DOCUMENTS

| | | | |
|---|---|---|---|
| 2016/0104508 A1* | 4/2016 | Chee ................... | H04N 21/2668 |
| | | | 386/227 |
| 2018/0075878 A1* | 3/2018 | Espeset ................ | H04N 19/587 |
| 2022/0021941 A1* | 1/2022 | Mitchard ............ | G06F 3/04883 |
| 2023/0014854 A1* | 1/2023 | Derbanne ................. | G06T 7/70 |

* cited by examiner

*Primary Examiner* — Thai Q Tran
*Assistant Examiner* — Nienru Yang
(74) *Attorney, Agent, or Firm* — Nicholson De Vos Webster & Elliott LLP

(57) ABSTRACT

A method comprises receiving one or more indications corresponding to one or more derivative video files. Each derivative video file of the one or more derivative video files has a different frame rate. The method further comprises selecting an indication of a derivative video file with a corresponding derivative video frame rate. The method further comprises receiving the derivative video file and an original video frame rate. The method further comprises determining a playback frame rate to slow a derivative video of the derivative video file using a desired frame rate, the derivative video frame rate, and the original video frame rate. The method further comprises displaying the derivative video at the determined playback frame rate.

20 Claims, 9 Drawing Sheets

VIDEO PROCESSING SYSTEM 600

USER INTERFACE MODULE 602

COMMUNICATION ORCHESTRATOR 604

FILE SELECTOR 614

RESOURCE MANAGER 606

ADAPTIVE MODEL 618

SLOW-MOTION MANAGER 616

FRAME RATE MANAGER 608

IDENTIFICATION INFORMATION 620

STORAGE MANAGER 610

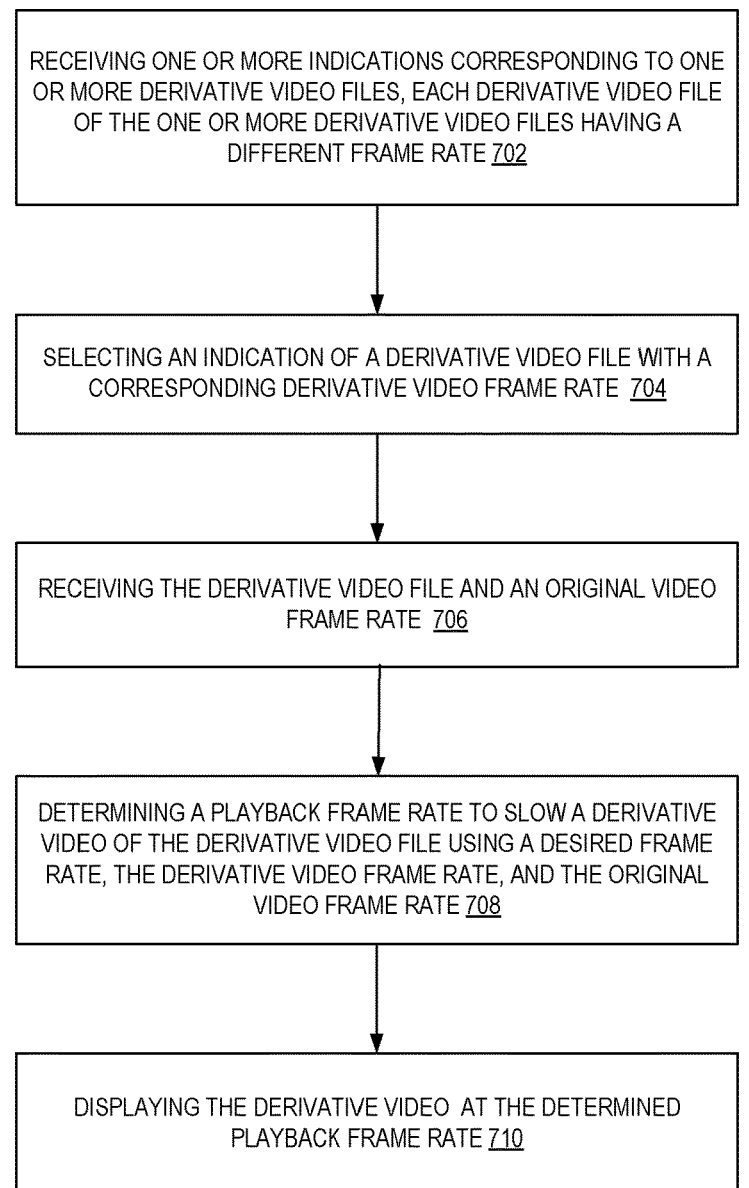

700

RECEIVING ONE OR MORE INDICATIONS CORRESPONDING TO ONE OR MORE DERIVATIVE VIDEO FILES, EACH DERIVATIVE VIDEO FILE OF THE ONE OR MORE DERIVATIVE VIDEO FILES HAVING A DIFFERENT FRAME RATE 702

SELECTING AN INDICATION OF A DERIVATIVE VIDEO FILE WITH A CORRESPONDING DERIVATIVE VIDEO FRAME RATE 704

RECEIVING THE DERIVATIVE VIDEO FILE AND AN ORIGINAL VIDEO FRAME RATE 706

DETERMINING A PLAYBACK FRAME RATE TO SLOW A DERIVATIVE VIDEO OF THE DERIVATIVE VIDEO FILE USING A DESIRED FRAME RATE, THE DERIVATIVE VIDEO FRAME RATE, AND THE ORIGINAL VIDEO FRAME RATE 708

DISPLAYING THE DERIVATIVE VIDEO AT THE DETERMINED PLAYBACK FRAME RATE 710

*FIG. 7*

COHERENT SLOW-MOTION VIDEO DISPLAYED ACROSS MULTIPLE DEVICES

BACKGROUND

Videos have become an integral part of our lives. With the advent of smartphone technology, it has recently become possible to take high frame rate videos, where the smartphone device captures a high number of frames per second (e.g., more than 60 frames per second). Captured videos can be slowed down to create slow-motion videos. Creating slow-motion videos is performed by presenting frames of the video at a rate slower rate than the captured fps frame rate.

SUMMARY

Introduced here are techniques/technologies that provide slow-motion video with improved aesthetics over prior techniques. A video processing system of the present disclosure obtains information that is distributed across different platforms, applications, servers, devices, and the like, and uses the information to determine a playback frame rate for a displayed slow-motion video. The video processing system leverages its connectivity to external resources to obtain a frame rate of an original video associated with each of multiple videos derived from an original video. The video processing system then selects a video to be slowed from the multiple derivative videos. Each of the derivative videos are different from the original video in terms of at least one of video file size, video frame rate, video color space, video bit depth, video codec-type, or other video properties. The selected video is the optimal video for the computing device executing the video processing system and/or the platform hosting the video processing the system based on available resources in the computing device executing the video processing system and/or hosting the video processing system. In other embodiments, the video processing system's selection of the optimal video file size is predetermined based on the particular computing device type and/or platform executing/hosting the video processing system. A selection of the derivative video based on an optimal video file size allows the video processing system to slow down the video in a computationally efficient, low-latency manner.

The video processing system is also able to seamlessly display a slow-motion video across multiple computing devices. The unique playback frame rate determined by each of multiple computing devices creates the same slow motion video effect, even though the properties of the video that is slowed down may be different at each of the multiple computing devices.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIG. 7 illustrates a flowchart of a series of acts in a method of displaying slow-motion videos in accordance with one or more embodiments;

DETAILED DESCRIPTION

One or more embodiments of the present disclosure include a video processing system that matches an apparent speed of action of a video across multiple devices displaying the video. Conventional approaches provide slow-motion video by displaying a video at a playback frame rate that is slower than the captured frame rate of the video. The visual aesthetics of the slow-motion video determined by conventional systems depend on the video file that is slowed down. As video file sizes increase, to accommodate higher quality videos captured at faster frame rates, the latency associated with displaying slow-motion videos increases. Conventional systems reduce the latency of displaying slow-motion videos by slowing down smaller video files created, in part, by reducing the frame rate in the smaller video file. When conventional systems display slow-motion video across multiple devices, each of the displayed videos across the multiple devices may have different apparent rates of action based on the slowed down frame rate of the slow-motion video. As a result, the slow-motion video displayed across the multiple devices will result in different rates of motion of the video.

To address these and other deficiencies in conventional systems, the video processing system of the present disclosure executes an adaptive model that provides a coherent slow-motion video irrespective of the video file that is slowed down. The video processing system determines an adaptive playback frame rate that causes the apparent rate of action of the slow-motion video to match apparent rates of action across any device displaying the slow-motion video. By decoupling the apparent rate of motion of a slow-motion video from the source video that is used to create the slow-motion video, computing devices can optimize the size of the source video file (or other properties of the source video file) while displaying coherent slow-motion video. In operation, each device displaying the slow-motion video produces consistent apparent rates of motion even though the source video used to create the slow-motion video may be different across devices. The video processing system is able to reduce latency associated with displaying slow-motion videos by slowing down derivative videos (e.g., video files with altered properties as compared to the original video file, such as a reduced frame-rate), such that the apparent rate of motion of the slowed-down derivative video matches the apparent rate of motion of the slowed-down original video regardless of whether or not the frame rate of the derivative video matches the frame rate of the original video. In this manner, the video processing system supports conservation of computing resources such as power, memory, and bandwidth associated with obtaining, storing, and/or slowing down large video files (e.g., non-derivative video files).

Figure 1:
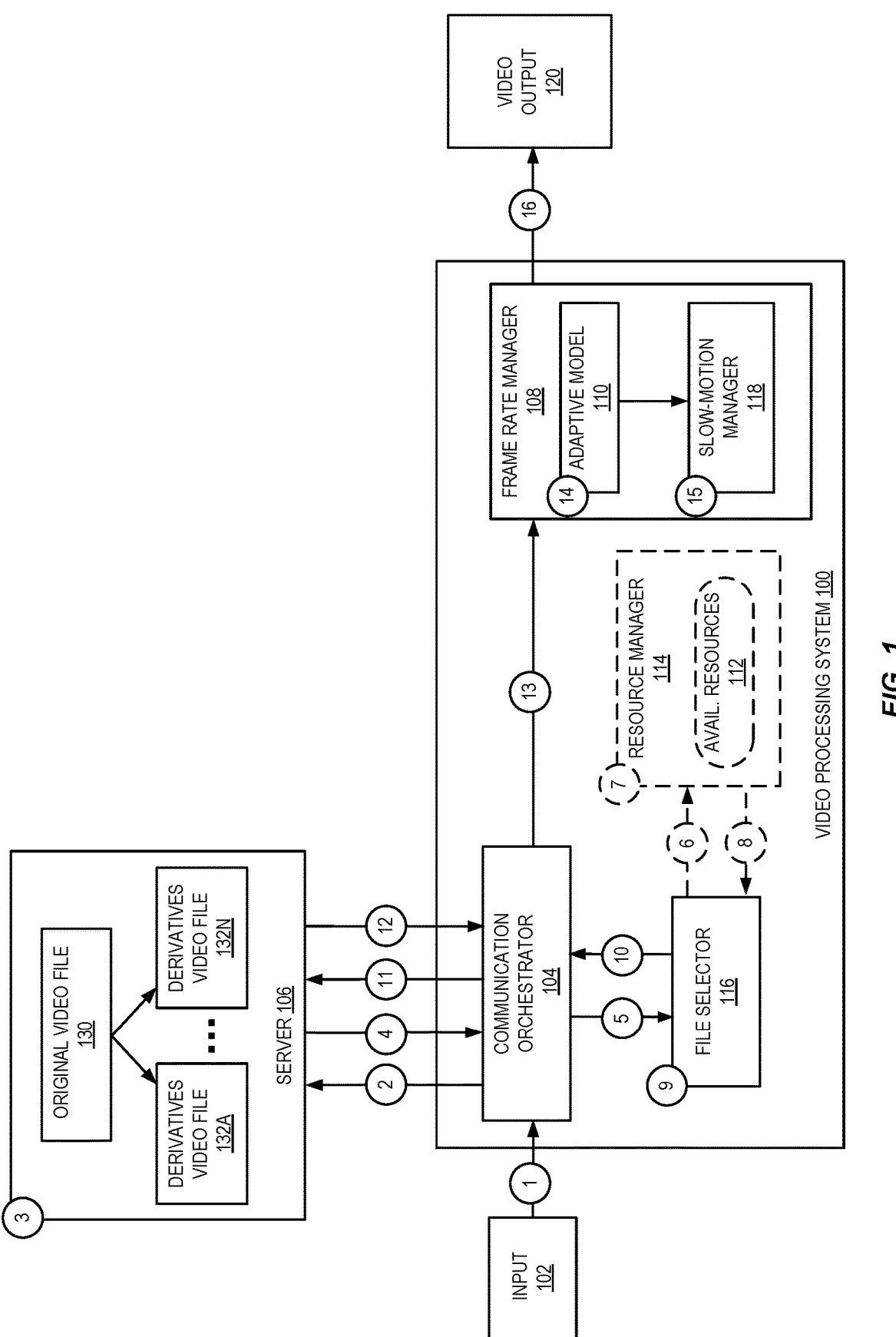
FIG. 1 illustrates a diagram of a process of providing a cohesive slow-motion effect regardless of a source video, in accordance with one or more embodiments.

FIG. 1 illustrates a diagram of a process of providing a cohesive slow-motion effect regardless of a source video, in accordance with one or more embodiments. As shown in FIG. 1, video processing system 100 includes a communication orchestrator 104, a resource manager 114, and a frame rate manager 108. In some embodiments, video processing system 100 may be implemented as part of a cloud-based image and/or video processing suite of software. The user may access such a video processing system via a client application executing on their computing device (e.g., a desktop, laptop, mobile device, etc.). In some embodiments, the client application (or "app") may be an application provided by the video processing system (or a service provider corresponding to the video processing system or other entity). Additionally, or alternatively, the user may access the video processing system via a browser-based application executing in a web browser installed on the user's computing device. Additionally, or alternatively, the video processing system 100 may be implemented entirely or in part on the user's computing device.

In some embodiments, the input 102 is an indication to display a slow-motion video. For example, a user may identify a particular video from a list of videos and select "slow-motion," prompting the video processing system 100 to slow down the identified video. As described herein, the stored videos are the original video files 130 stored by the server 106. Each of the stored videos are identifiable using a content identification number or other identifier.

In some embodiments, a user may indicate that a new video is to be slowed down. For example, the computing device may be used to record a video, or receive an uploaded video, and subsequently the user indicates that the newly uploaded/recorded video is to be slowed down. In these embodiments, the input 102 may include the newly uploaded/recorded video and an accompanying content identification number such that the server 106 can store the newly uploaded video and content identification number in an original video file 130.

As shown in FIG. 1, at numeral 1, input 102 is provided to the communication orchestrator 104. As described herein, the communication orchestrator 104 requests information from the server 106 and/or provides information to the server 106 associated with input 102 (e.g., at numeral 2, numeral 4, numeral 11, and numeral 12). For example, as described herein, the communication orchestrator 104 requests one or more derivative video files 132 associated with the original video file 130, the communication orchestrator 104 receives an indication of the one or more derivative video files 132 associated with the original video file 130, the communication orchestrator 104 requests a specific derivative video file 132, and the communication orchestrator 104 receives the specific derivative video file. In some embodiments, the communication orchestrator 104 provides the newly uploaded/recorded video to the server 106 such that the server can store the original video in an original video file 130 and generate derivative video files 132, as described herein.

In some embodiments, the communication orchestrator 104 and server 106 communicate (e.g., at numeral 2, numeral 4, numeral 11, and numeral 12) using an application programming interface (API). The API enables different services of the communication orchestrator 104 and server

106 to communicate and/or exchange data. Generally, the communication orchestrator 104 performs an API call and receives an API response including data that the interface manager 104 can use to provide a service and/or function.

At numeral 2, the communication orchestrator 104 queries the server 106 for derivative video files 132 associated with the requested video identified in input 102. In some embodiments, before the communication orchestrator 104 queries the server 106, the communication orchestrator 104 queries one or more data stores or other memory of a client device hosting the video processing system 100 for a copy of the original video file 130 or any derivative video files (e.g., a previously requested derivative video file) identified in input 102. If the communication orchestrator 104 receives the original video file 130 and/or a previous derivative video file internally from the client device, the operations may skip to those described at numeral 13. If the communication orchestrator 104 does not receive the original video file 130 and/or a previous derivative video file internally from the client device, the operations proceed to numeral 3.

At numeral 3, the server 106 determines one or more derivative video files 132 associated with the requested video. For example, in response to receiving the request from the communication orchestrator 104, the server 106 matches the video identified in the request to an original video file 130 by matching content identification numbers or other video identifiers. The original video file 130 is the video file including the original video recording (e.g., the captured video created by recording an event). The frame rate of the captured video is dependent on the recording device used to capture the event. While one original video file 130 is shown, it should be appreciated that the server 106 manages and stores multiple original video files 130.

As shown, each original video file 130 is associated with multiple derivative video files 132. A derivative video file includes derivative videos that are a representation of the original video using a smaller video file. The derivative videos can differ from the captured (otherwise referred to herein as "original") video in terms of video file size, video frame rate, video color space, video bit depth, video codec-type, and the like. The server 106 generates the derivative video file 132 using any suitable mechanism such as transcoding the original video into a video with a lesser frame rate, lesser bit rate, smaller file size, etc. The file size and/or frame rate of each of the generated derivative videos of the derivative video files 132 may be predetermined. For example, for each received original video, the server 106 generates a derivative video file 132 including a derivative video at 120 fps, a derivative video file 132 including a derivative video at 60 fps, a derivative video file 132 including a derivative video at 30 fps, and the like.

Once the server 106 matches the requested video to a stored video of the original video files 130 (or otherwise identifies derivative video files 132 associated with the original video file 130), the server 106 transmits, at numeral 4, an indication of each derivative video file 132 associated with the original video file 130. For example, the server 106 transmits a list/manifest including each of the file sizes of the derivative files, each of the frame rates of the derivative files, and the like. In some embodiments, the list including derivative video file 132 information also includes original video file information such as the frame rate, the file size, and the like. In other embodiments, as described herein, the server 106 determines which derivative video file 132 to send to the communication orchestrator 104 using one or more identifiers associated with the communication orchestrator 104, a user profile identification, and the like.

At numeral 5, the communication orchestrator 104 passes the one or more indications corresponding to one or more derivative video files (e.g., a list including a file size of each derivative video file, a frame rate of each derivative video in each of the derivative video files, etc.) to the file selector 116.

In some embodiments, optionally, at numeral 6, the file selector 116 queries the resource manager 114 for available resources 112 such as available memory, available power, and the like when the file selector 116 receives the list including one or more properties associated with multiple derivative video files. In some embodiments, the resource manager 114 periodically updates the file selector 116 with available resources 112. In some embodiments, the file selector 116 queries the resource manager 114 for other resource information such as total resources, resource limitations, and the like. For example, a resource limitation may be the refresh rate of a display coupled to a computing device executing the video processing system 100. The refresh rate of the display indicates the maximum frame rate that can be displayed in a visually aesthetic manner.

At numeral 7, the resource manager 114 determines available resources 112 using any suitable mechanism such as by polling one or more upstream and/or downstream systems for power usage, memory usage, and the like. The resource manager 114 determines the available resources 112 by taking a difference using the received resource usage information and a total resource of the computing device executing the video processing system 100. For example, the resource manager 114 takes the difference between the total power of the computing device and the power used by one or more upstream systems to determine the available power. At numeral 8, the resource manager 114 passes the available resources 112 or other resource information to the file selector 116.

At numeral 9, the file selector 116 determines an optimal derivative video file of the received one or more derivative video files using a preconfigured mapping and/or the available resources. In some embodiments, the file selector 116 uses the available resources 112 received from the resource manager 114 to select a derivative video file 132 of the list of derivative video files 132 received from the communication orchestrator 104. For example, the file selector 116 uses one or more thresholds and the available resources 112 to select the derivative video file 132. In one embodiment, if the available power is above a first power threshold, the file selector 116 selects the derivative video file 132 mapped to the first power threshold. In some embodiments, the file selector 116 selects the derivative video file 132 using multiple thresholds (e.g., a memory threshold and a power threshold). An example mapping of the thresholds and available resources is shown below in Table 1. As shown, the resource thresholds may vary depending on the resource. For example, the power thresholds are different from the memory thresholds.

TABLE 1

| Resource to Derivative File Mapping | | |
| --- | --- | --- |
| Power Thresholds | Memory Thresholds | Derivative File frame rate |
| Above 50% power | Above 50% RAM | 15 FPS |
| Above 70% power | Above 80% RAM | 15 FPS |
| Above 90% power | Above 90% RAM | 30 FPS |

In other embodiments, the file selector 116 is preconfigured to select a derivative video file 132 from the list of derivative video files 132 based on a computing device identifier identifying the computing device executing video processing system 100, a platform identifier identifying the platform hosting video processing system 100, and the like. For example, if the video processing system 100 is implemented in a mobile computing device, based on the computing device identifier identifying a "mobile computing device," the file selector 116 is preconfigured to select a derivative video file with a frame rate of 120 fps and a corresponding file size. If the video processing system 100 is implemented in a web-browser, based on the platform identifier identifying "web-browser," the file selector 116 is preconfigured to select a derivative video file with a frame rate of 60 fps and a corresponding file size. The derivative video file with the frame rate of the 120 fps is a larger file size than the derivative video file with the frame rate of 60 fps.

By selecting a file using the file selector 116, the video processing system 100 obtains a file that is optimal given the available resource and/or the preconfigured settings. By selecting a file that is optimal given the available resources and/or the preconfigured settings, the video processing system 100 does not obtain a file from the server 106 and/or operate on an original video that is too large. Slowing down an unnecessarily large original video file can unnecessarily delay the display of a desired slow-motion video. Instead of slowing down an original video file with a high frame rate/large file size to create a slow-motion video, the video processing system 100 can use the selected video file (e.g., a derivative video file) with the optimized frame rate for the specific implementation of the video processing system 100. As a result, the video processing system 100 converts the video of the derivative video file into a slow-motion video in a reduced latency (or low latency) manner. As used herein, the "apparent rate of motion" is the displayed movement/motion of the subject matter captured in the video. In other words, the "apparent rate of motion" is the human interpretation of the motion of content captured in the video. The apparent rate of motion is created by slowing down a source video at an adaptive playback frame rate.

The file selector 116 then communicates the selected derivative video file 132 to the communication orchestrator 104 at numeral 10. The communication orchestrator 104 and server 106 communicate again at numeral 11, where the communication orchestrator 104 transmits a request for the selected derivative video file from the list of derivative video files to the server 106. In response to receiving the request, the server 106 transmits the derivative video file to the communication orchestrator 104 at numeral 12. If the original video frame rate was not previously communicated by the server 106, the server 106 transmits the original file frame rate. Accordingly, at numeral 12, the communication orchestrator 104 receives, from the server 106, a derivative video file including a derivative video at a derivative frame rate and an original video file frame rate. The derivative video (also referred to herein as the "source video") included in the derivative video file 132 is the video that will be slowed down by the video processing system 100.

At numeral 13, the communication orchestrator 104 passes information received (such as the received original file frame rate, and the source frame rate (determined from the derivative video file)) to the frame rate manager 108. The frame rate manager 108 executes the adaptive model 110 to determine the playback frame rate of the source video. The adaptive model 110 is executed to decouple the source video frame rate from a playback frate rate. As described herein, if the adaptive model 110 were not executed to determine the playback frame rate, the source video may be slowed using the source frame rate in a manner that results in the motion of subjects within the source video whose apparent sloweddown speed does not match the apparent slowed-down speed of the motion of the subjects within the original video.

The frame rate manager 108 executes the adaptive model 110 using the original video frame rate, the derivative video frame rate (e.g., the source video frame rate), and a desired frame rate. In some embodiments, the desired frame rate is predetermined based on the computing device executing the video processing system 100, the platform hosting the video processing system 100, a user profile preference, an administrator configuration, and the like. For example, an administrator may set all slow-motion videos to be slowed down by ⅛ of the original video frame rate. Alternatively, an administrator may set all slow-motion videos to be slowed down to a rate of playback that would allow every frame within the slow-motion video to be displayed at a frame rate of 30 fps.

In some embodiments, the desired frame rate is received as part of input 102. In some embodiments, if the desired frame rate is received as part of input 102, the communication orchestrator 104 transmits the desired frame rate to the server 104 such that the server 106 can update a user profile and/or otherwise store the desired frame rate. In some embodiments, the user profile (stored by the server 106) includes a unique desired frame rate corresponding to unique platforms executing the video processing system 100. For example, a user profile has indicated the desired frame rate displayed by a desktop application of the video processing system is 60 fps, and a desired frame rate displayed by a mobile application of the video processing system is 30 fps. In some embodiments, the desired frame rate is received by the communication orchestrator 104 from the server 106. For example, the communication orchestrator 104 receives user profile information from the server 106 including a previously determined desired frame rate. The desired frame rate and user profile is described in more detail with reference to FIG. 5.

At numeral 14, the adaptive model 110 determines the playback frame rate using the desired frame rate, the original video frame rate, and the source video frame rate. The adaptive model 110 can be expressed mathematically using Equation (1) below:

$$\text{Playback } fps = \text{Desired } fps \left( \frac{\text{source file } fps}{\text{original file } fps} \right) \qquad (1)$$

The determined playback frame rate results in a slowed video that appears visually coherent and smooth, regardless of the frame rate of the source video. For example, instead of simply slowing down the frame rate of a source video, the adaptive model 110 considers the original frame rate of the original video to slow down the source video such that the determined playback frame rate of the source video makes the apparent rate of motion of the subjects within the source video match the apparent rate of motion of the subjects within the original video. The inclusion of the original video frame rate in the adaptive model 110 allows the playback frame rate to adapt to the frame rate of the source video. In this manner, a source video (such as a smaller sized derivative video) can be slowed while maintaining the same apparent rate of motion of subjects as is displayed within the slowed-down original video. Accordingly, the adaptive model 110 decouples the file size from the visual aesthetics of the slowed video.

As described herein, conventional systems that slow down an original video frame rate using an already reduced frame rate (e.g., a derivative video file having a derivative frame rate) produce apparent rates of motion of subjects in the slow-motion video that can differ between the original video and the source video. That is, in conventional systems, the apparent rate of motion associated with the slow-motion video is dependent on, in part, the frame rate of the derivative video, resulting in different apparent rates of motion associated with different derivative videos.

At numeral 15, the slow-motion manager 118 receives the playback frame rate determined by the adaptive model 110 and the source video (obtained from the selected derivative video file). The slow-motion manager 118 slows the source video at the determined playback speed by displaying the source video at a lesser frame rate (e.g., the determined playback speed) that effectively converts the source video into a slow-motion video.

At numeral 16, the frame rate manager outputs video output 120, which is the slow-motion video determined by the slow-motion manager 118. The video output 120 may be displayed to a user using a display of the computing device and/or further processed at one or more downstream systems.

While not illustrated, in one or more embodiments, the server 106 includes all, or a portion of, the video processing system 100, such as the frame rate manager 108 and/or the file selector 116. For example, when located in the server 106, the video processing system 100 comprises an application running on the server 106 or a portion of a software application that is downloaded to a client device executing the frame rate manager 108 and/or the file selector 116. In this manner, the server 106 can determine the playback frame rate using the adaptive model 110 of the frame rate manager 108 to expedite the client device hosting the video processing system 100 display a slow-motion video. Instead of transmitting the derivative video file and the original video frame rate as described above, the server 106 transmits the playback frame rate and the derivative video file. Additionally, the server 106 can select the optimal file for the client device hosting the video processing system 100 using the file selector 116. In some embodiments, the server 106 maps identification information received from a client device hosting the video processing system 100 (e.g., received in a request transmitted from the communication orchestrator 104, as described herein) to an optimal derivative video file based on predetermined administrative settings. In other embodiments, the server 106 queries the communication orchestrator 104 for available resources 112 or other resource information to determine the optimal derivative video file, as described herein.

Figure 2:
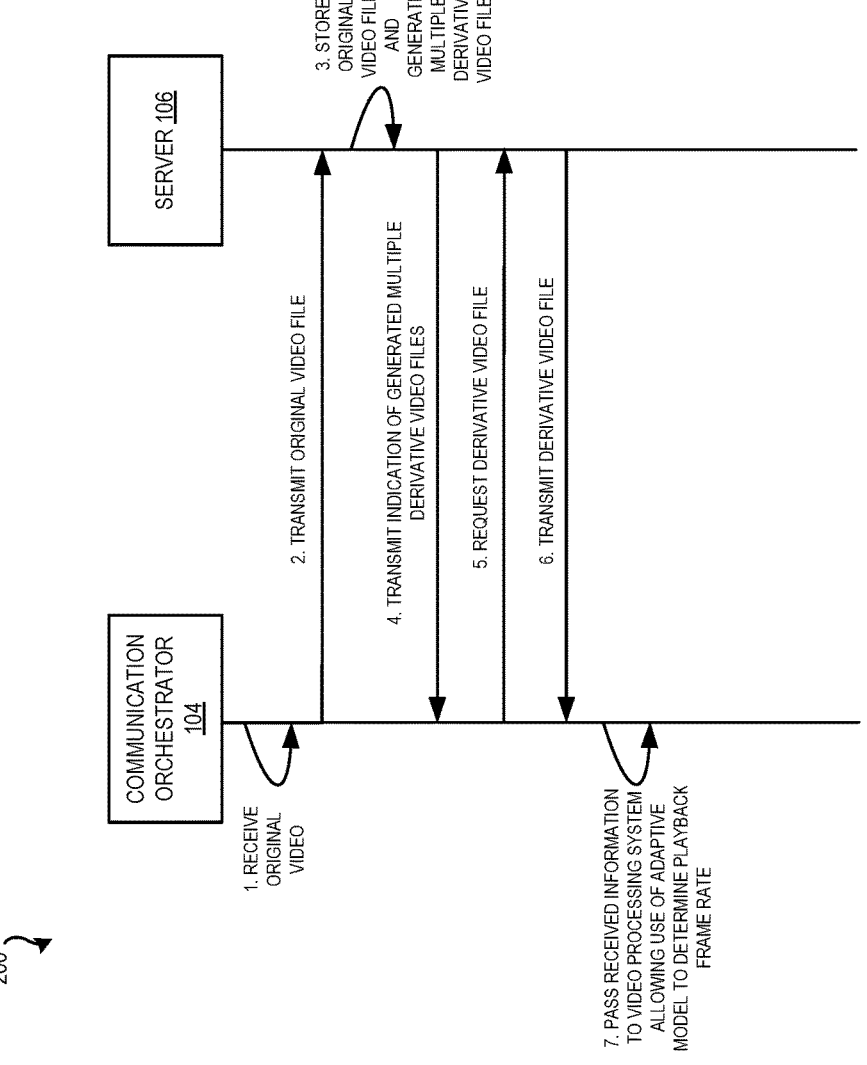
FIG. 2 illustrates a flow diagram of a first example of providing a cohesive slow-motion effect regardless of a source video, in accordance with one or more embodiments.

FIG. 2 illustrates a flow diagram of a first example of a cohesive slow-motion effect regardless of a source video, in accordance with one or more embodiments. In example 200 of FIG. 2, the communication orchestrator 104 receives information from the server 106 sufficient to allow the video processing system to execute the adaptive model. At numeral 1, the communication orchestrator 104 receives an original video file. For example, an image capture system (or some other upstream system on the user computing device) passes a captured video (otherwise referred to herein as the "original video") to the communication orchestrator 104 of the video processing system 100. Additionally or alternatively, a user can upload original video to the video processing system 100. The video can include any digital visual media including a plurality of frames which, when played, comprises a moving visual representation (or image) of a story, event, picture, illustration, icon, and/or symbol.

At numeral 2, the communication orchestrator 104 transmits the received original video to the server 106. In some embodiments, the communication orchestrator 104 passes a reference (e.g., a URL, URI, or other reference) to the server 106 indicating a location of the original video file including the original video in a storage system (e.g., a cloud-based storage). In some embodiments, when the communication orchestrator 104 transmits the received original video to the server 106, the communication orchestrator 104 also transmits identification information such as metadata including a computing device identifier (e.g., a phone number, an IP address, etc.) and/or a platform identifier (e.g., web-browser) in which the video processing system 100 is being executed, a user profile associated with the original video, etc. In an example, the identification information indicates that the video processing system 100 is being hosted using a web-browser.

At numeral 3, the server 106 stores the original video file including the original video and generates multiple derivative files. As described herein, derivative files are smaller versions of the original video. For example, the derivative video file size is smaller than the original video file size due, in part, to a reduced frame rate of the derivative video of the derivative video file as compared to the frame rate of the original video of the original video file. Each of the generated derivative video files may have different one or more properties (e.g., different frame rate). In some embodiments, the server 106 generates the derivative video files based on an administrative setting (e.g., a predetermined number of derivative video files at predetermined file sizes, frame rates, etc.), historic devices and/or platforms that have queried the server 106 for specific derivative video files (e.g., a desktop computing device querying the server 106 for a derivative video file including a derivative video at 240 fps, a web-browser querying the server 106 for a derivative video file including a derivative video at 30 fps, etc.), and the like. For example, the server 106 generates derivative files with a corresponding frame rate that is optimized for specific platforms, computing devices, and the like. In a non-limiting example, the server 106 generates a first derivative video of the original video at 120 fps, which is the frame rate that optimizes the latency associated with a particular mobile computing device displaying a slowed down video; the server 106 generates a second derivative video of the original video at 60 fps, which is the frame rate that optimizes the latency associated with a web-browser executed video processing system 100 displaying a slowed down video; the server 106 generates a third derivative video of the original video at 30 fps, which is the frame rate associated with a particular user profile (e.g., a user preference), and the like. The server stores each of the first derivative video, the second derivative video, and the third derivative video in a first derivative video file, a second derivative video file, and a third derivative video file respectively.

At numeral 4, the server 106 transmits an indication of the generated multiple derivative files. For example, the server 106 transmits each of the frame rates of each of the derivative videos, each of the file sizes of each of the derivative video files, and the like, in a list or other data structure.

At numeral 5, the communication orchestrator 104 requests a derivative video file from the list including indications of the generated multiple derivative video files from the server 106. As described herein, the file selector 116 of the communication orchestrator 104 selects a derivative file based on the capacity, bandwidth and/or power requirements of a computing device executing the video processing system 100. Additionally or alternatively, the file selector 116 of the communication orchestrator 104 selects a derivative video file based on the capacity, bandwidth, and/or power requirements of a platform hosted by the computing device executing the video processing system 100.

At numeral 6, the server 106 transmits the requested derivative video file to the communication orchestrator 104. Additionally, at numeral 6, the server transmits the original file frame rate. In some embodiments, instead of performing operations described at numerals 4-5, the server 106 selects the derivative video file from the multiple generated derivative video files and transmits the derivative video file. For example, the server 106 compares the identification information received from the communication orchestrator 104 at numeral 2 (e.g., metadata including a computing device identifier, a platform identifier, a user profile associated with the transmitted original video file, etc.) to a data structure mapping identification information to derivative video files. Responsive to matching the identification information received from the communication orchestrator 104 at numeral 2 to identification information in a data structure at the server 106, the server 106 selects the derivative video file corresponding to the identification information.

Numerals 1-6 of example 200 depict an example flow diagram of the operations described with respect to numerals 1-12 (excluding optional numerals 6-8) with reference to FIG. 1. At numeral 7, the communication orchestrator 104 passes the received information from the server 106 to the adaptive model of the video processing system 100. The adaptive model determines a playback frame rate given the derivative video file and the original video frame rate. Numeral 7 of example 200 depicts the operations described with reference to numerals 13-14 in FIG. 1. As described herein, the playback frame rate is determined using the adaptive model such that the slow-motion video produced from the derivative video is coherent (e.g., the apparent slow-motion rate of the subjects of the derivative video match the apparent slow-motion rate of the subjects of the original video), irrespective of the size of the derivative video file used to create the slow-motion video. Subsequently, the slowed video is displayed to the user at an apparent rate of motion (visualized by slowing down the derivative video at the determined playback frame rate) that is understandable to the user as the motion of subject matter captured in the video.

Figure 3:
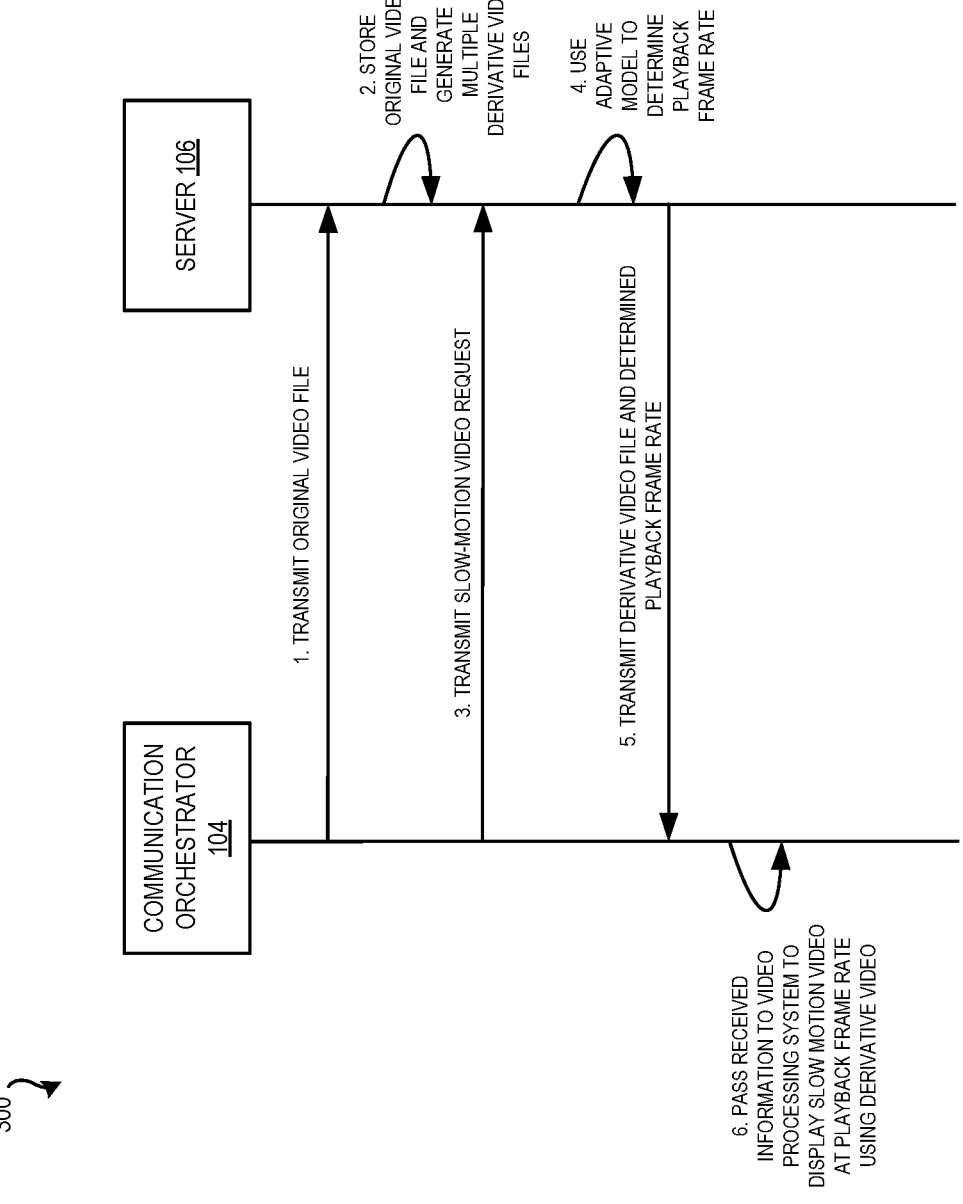
FIG. 3 illustrates a flow diagram of a second example of providing a cohesive slow-motion effect regardless of a source video, in accordance with one or more embodiments.

FIG. 3 illustrates a flow diagram of a second example of providing a cohesive slow-motion effect regardless of a source video, in accordance with one or more embodiments. In example 300 of FIG. 3, the server 106 executes the adaptive model and passes the determined playback frame rate to the communication orchestrator 104.

At numeral 1, the server 106 receives the original video file from the communication orchestrator 104. For example, an original video is uploaded in an original video file to a cloud-based storage location (or other Internet-accessible storage location such as server 106). Additionally or alternatively, the server 106 is provided a reference (e.g., a URL, URI, or other reference) of the original video and obtains the original video file using the reference. As described herein, the original video may be the video captured when an event is recorded. The frame rate of the captured video is dependent on the recording device used to capture the event. In some embodiments, when the server 106 receives the original video from the communication orchestrator 104, the server 106 also receives identification information such as metadata including a computing device identifier (e.g., a phone number, an IP address, etc.) and/or a platform identifier (e.g., web-browser) in which the video processing system 100 is being executed, a user profile associated with the original video, etc. In some embodiments, the server 106 receives content identification associated with the original video. In other embodiments, the server 106 determines the content identification associated with the original video using any suitable mechanism such as assigning the received original video an incremented value of the total number of original videos stored in the server 106, the total number of original videos associated with a user profile, and the like. If the server 106 assigns the original video the content identification, then the server 106 may transmit the content identification number to the communication orchestrator 104.

At numeral 2, the server 106 stores the original video file (and the content identification number) and generates multiple derivative video files. As described herein, a derivative video file is a representation of the original video file using a smaller video file. The derivative video file can differ from the captured (otherwise referred to herein as "original") video file in terms of video frame size, video frame rate, video color space, video bit depth, video codec-type, and the like. The server 106 generates the derivative video file using any suitable mechanism such as reducing the frame rate of the original video of the original video file. The file size and/or frame rate of each of the generated derivative video files may be predetermined. For example, for each received original video file, the server 106 generates a derivative video file at 120 fps, a derivative video file 132 at 60 fps, a derivative video file 132 at 30 fps, and the like. The operations of numerals 1-2 may occur at a time period before the operations at numeral 3 to prepare the server 106 for the operations at numeral 3. By generating multiple derivative video files at numeral 2 before the server 106 receives a slow-motion video request at numeral 3, the server 106 is able to reduce latency associated with selecting a derivative video file associated with the slow-motion video request, as described herein.

At numeral 3, the server 106 receives a slow-motion video request. The slow-motion video request may include a content identification number identifying an original video that is being stored in the server 106. The content identification number identifies the original video that is to be slowed down. In addition, the server 106 may receive, from the communication orchestrator 104, identification information such as metadata including a computing device identifier and/or a platform in which the communication orchestrator 104 of the video processing system 100 is being executed on, a user profile associated with the original video, etc.

At numeral 4, the server 106 uses the adaptive model to determine a playback frame rate. As described herein, the adaptive model requires a desired frame rate, an original video frame rate, and a derivative video frame rate.

In some embodiments, the server 106 determines the desired frame rate according to one or more stored user preferences. For example, using the identification information received in the slow-motion video request at numeral 3, the server 106 matches a user profile stored in the server 106 to the user profile received in the identification information. In other embodiments, the server 106 determines the desired frame rate according to a user input received in the slow-motion video request at numeral 3. In some embodiments, the server 106 updates the user profile stored in the server 106 with the user input specifying the desired frame rate. In some embodiments, the desired frame rate is a preconfigured frame rate such as 30 fps.

The server 106 selects a derivative video file from multiple derivative video files associated with an original video file to obtain the derivative video frame rate. When the server 106 selects the derivative video file, the server 106 is also able to obtain the corresponding original video frame rate because, as described herein, the multiple derivative video files are associated with a single original video file. Accordingly, when the server 106 determines which derivative video file to select from the multiple derivative video files, the server 106 can identify the corresponding original video file and the associated original video frame rate.

To identify a derivative video file from the multiple generated derivative video files, the server 106 maps identification information received from the communication orchestrator 104 at numeral 3 to stored identification information. For example, the identification information can include a computing device identifier. The server 106 uses the computing device identifier to map the computing device executing the video processing system to a derivative video file. Such mappings may be determined by an administrator. For example, an administrator may map any mobile devices to a derivative video file including a derivative video at 120 fps. In some embodiments, the server 106 selects the derivative video file based on a previously requested derivative video file associated with the computing device identifier in the identification information. For example, during a first time period, the server 106 receives a derivative video file request from the communication orchestrator 104 (as described with reference to numeral 5 in FIG. 2). The derivative video file request includes the computing device identifier (e.g., an IP address, a phone number, etc.). During the first time period, the server 106 stores the derivative video file request and the associated computing device identifier such that during a second time period (e.g., at numeral 3 of FIG. 3 described above), the server 106 can map the received computing device identifier to the previously requested derivative video file. In this manner, the server 106 determines the derivative video frame rate.

At numeral 5, the server 106 transmits the determined playback frame rate (using the adaptive model at numeral 4) and the derivative video file to the communication orchestrator 104. At numeral 6, the communication orchestrator 104 passes the received information from the server 106 to allow the video processing system 100 to slow the derivative video (e.g., a source video) included in the derivative video file at the determined playback frame rate. For example, as discussed above in FIG. 1, the slow-motion manager 118 slows the source video at the playback frame rate determined by the server 106. Subsequently, the slowed video is displayed to the user at an apparent rate of motion that is understandable to the user as the motion of subject matter captured in the video.

Figure 4:
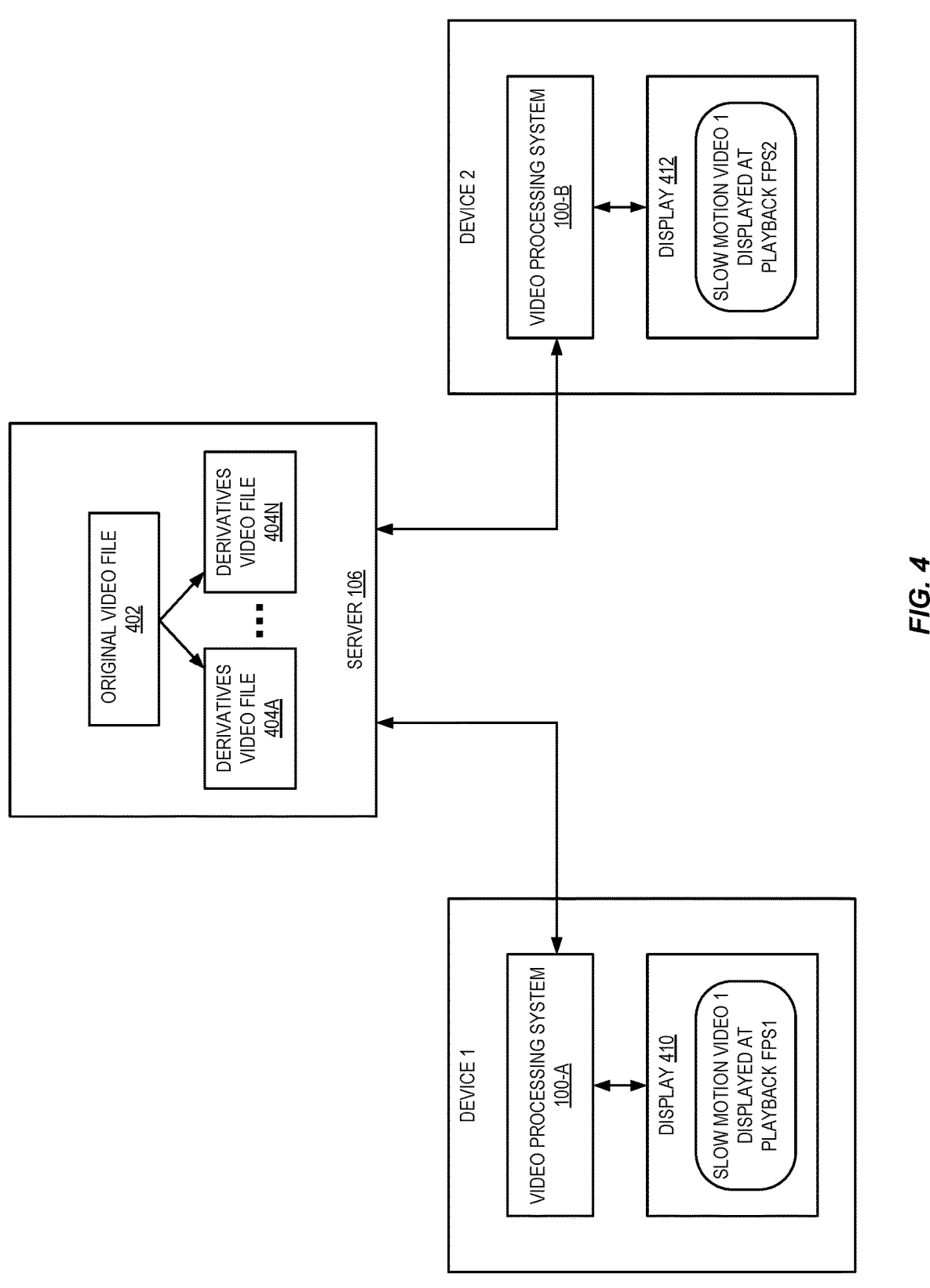
FIG. 4 illustrates an example of coherent slow-motion video displayed across multiple devices, in accordance with one or more embodiments.

FIG. 4 illustrates an example of coherent slow-motion video displayed across multiple devices, in accordance with one or more embodiments. As shown, the original video file 402 is associated with N derivative video files derivative video file 404A-404N. The server 106 generates derivative video files based on a number of preconfigured derivative video files at preconfigured derivative video frame rates, file sizes, and the like; a historic request of a derivative video at a derivative video frame rate; and the like. As shown, each of device 1 hosting video processing system 100-A and device 2 hosting video processing system 100-B communicate with the server 106. Because device 1 is different from device 2 (e.g., device 1 may be a desktop device and device 2 may be a mobile device), the video processing system 100-A of device 1 will request a different derivative video file than the video processing system 100-B of device 2. As shown, the display 410 associated with device 1 is different from the display 412 associated with device 2. Each display may have different resource limitations that affect the display of videos. For example, the display 410 coupled to device 1 may have a higher refresh rate than the display 412 coupled to device 2.

In one embodiment, if device 1 is a desktop device, the video processing system 100-A of device 1 requests a derivative video file 404A that includes a derivative video at 240 fps. If device 2 is a mobile device, the video processing system 100-B of device 2 requests a derivative video file 404B that includes a derivative video at 120 fps. In this manner, the first device is requesting a video file at a first frame rate, and the second device is requesting the same video file at a second frame rate. As described herein, each of the devices may request different derivative video files based on the current available resources of the device, preconfigured mappings relating the device to an optimal frame rate for that device, and the like. Although each device has requested different derivative video files, both devices can display the same slow-motion video (e.g., slow-motion video 1). This is because the derivative videos received by each of the devices, while different frame rates, file sizes, etc., are still videos conveying the subject matter of original video file 402. As shown, the same slow-motion video 1 is displayed at each device at different frame rates. For example, device 1 is displaying the slow-motion video 1 at playback FPS 1, while device 2 is displaying the slow-motion video 1 at playback FPS 2. The slow-motion video displayed at each device is coherent, meaning that both devices display a matched motion of the subjects of the respective slow-motion videos. Each of the video processing systems of the devices execute the adaptive model using the received derivative video frame rate, the desired frame rate, and the original frame rate. Accordingly, each of the video processing systems determine a unique playback frame rate that is used to slow down the respective derivative videos in a way that makes the apparent rate of motion of the two different derivative videos match.

In one embodiment, the original video file 402 includes an original video captured at 240 fps. The desired frame rate is preconfigured according to an administrator setting at 30 fps. As described herein, device 1 receives the derivative video file 404A including a derivative video at 240 fps. The derivative video file 404A is the same frame rate as the original video file but may have other altered properties such as color space, bit depth, codec-type, and the like. In some embodiments, device 1 receives the original video file including the original video at 240 fps. As described herein, the derivative video of the derivative video file is the source video that is slowed down by the video processing system 100-A. The playback frame rate, determined using the video processing system 100-A according to the processes described herein, is determined to be:

$$Playback\ fps = Desired\ fps\left(\frac{source\ file\ fps}{original\ file\ fps}\right) = 30\,fps\left(\frac{240\,fps}{240\,fps}\right) = 30\,fps$$

As described herein, device 2 receives the derivative video file 404B including a derivative video at 120 fps. The derivative video file frame rate (and the corresponding derivative video) is the source video file frame rate (and the corresponding source video). The playback frame rate, determined using the video processing system 100-B according to the processes described herein, is determined to be:

$$Playback\ fps = Desired\ fps\left(\frac{source\ file\ fps}{original\ file\ fps}\right) = 30\,fps\left(\frac{120\,fps}{240\,fps}\right) = 15\,fps$$

Figure 5:
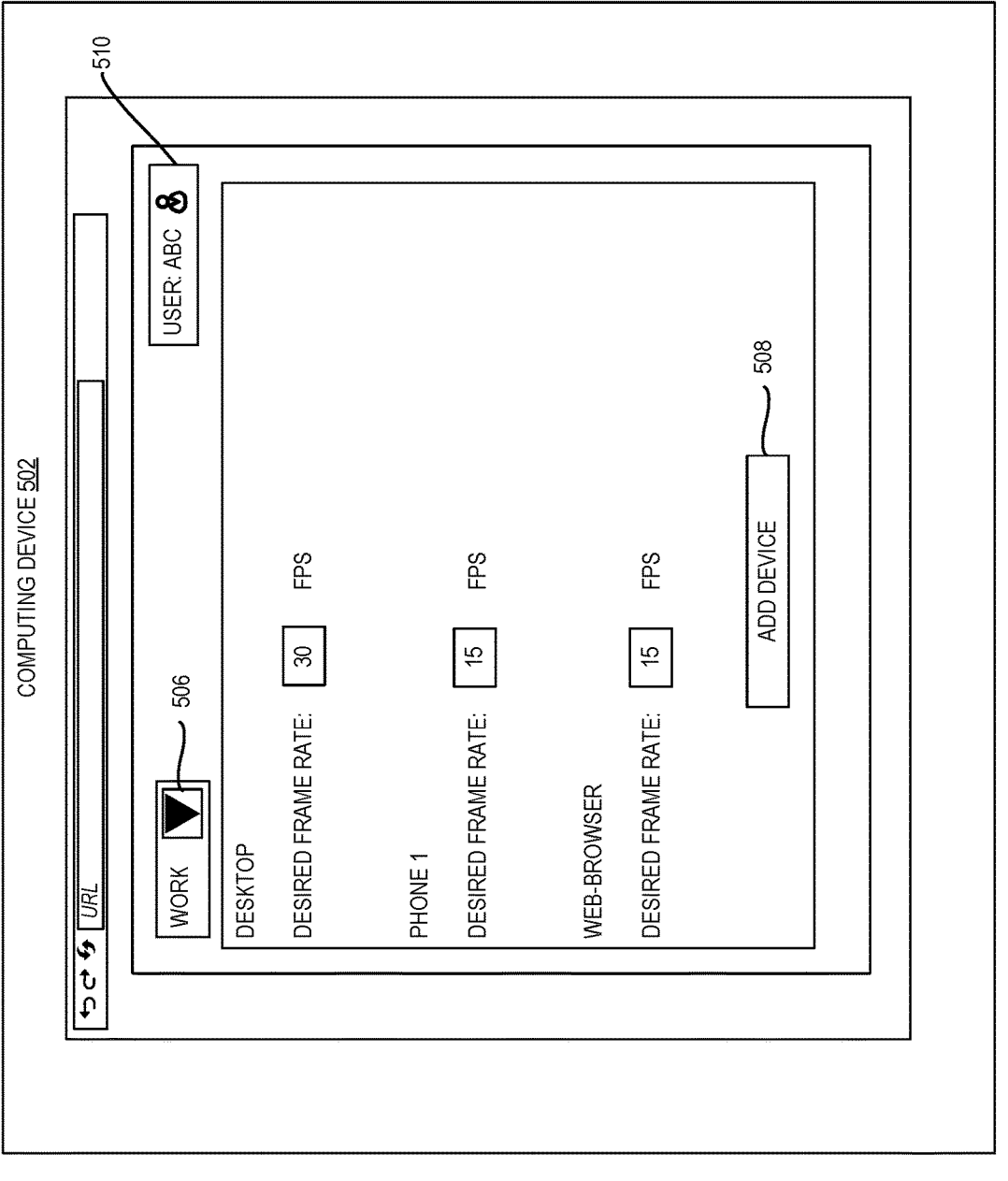
FIG. 5 illustrates an example of user preferences, according to one or more embodiments.

FIG. 5 illustrates an example of user preferences, according to one or more embodiments. In some embodiments, the desired frame rate is preconfigured by an administrative setting such that the desired frame rate is the same for each device executing the video processing system and/or hosting the video processing system. In other embodiments, a user may set user preferences that set different desired frame rates for different devices.

As shown, a user is logged into an application hosting the video processing system at 510. The user is using computing device 502 to execute a web-browser 504 that hosts the video processing system. Each user profile may be linked/associated with one or more different sub-profiles as indicated by 506. As shown, a "work" user sub-profile is created for a particular user 510. Each user profile (and/or the one or more user sub-profiles for each user profile) can include a preference of a desired frame rate for a particular computing device/platform. If a user updates a desired frame rate, then the computing device 502 transmits the desired frame rate associated with that platform/computing device to the server 106. The server 106 manages the user preferences of a user profile and/or each user sub-profile associated with a user profile. As shown, even though the user is using the web-browser, the user is able to update the desired frame rate at any of the other devices/computing platforms associated with the user profile. Additionally, at 508, the user may add additional devices associated with the user profile.

Figure 6:
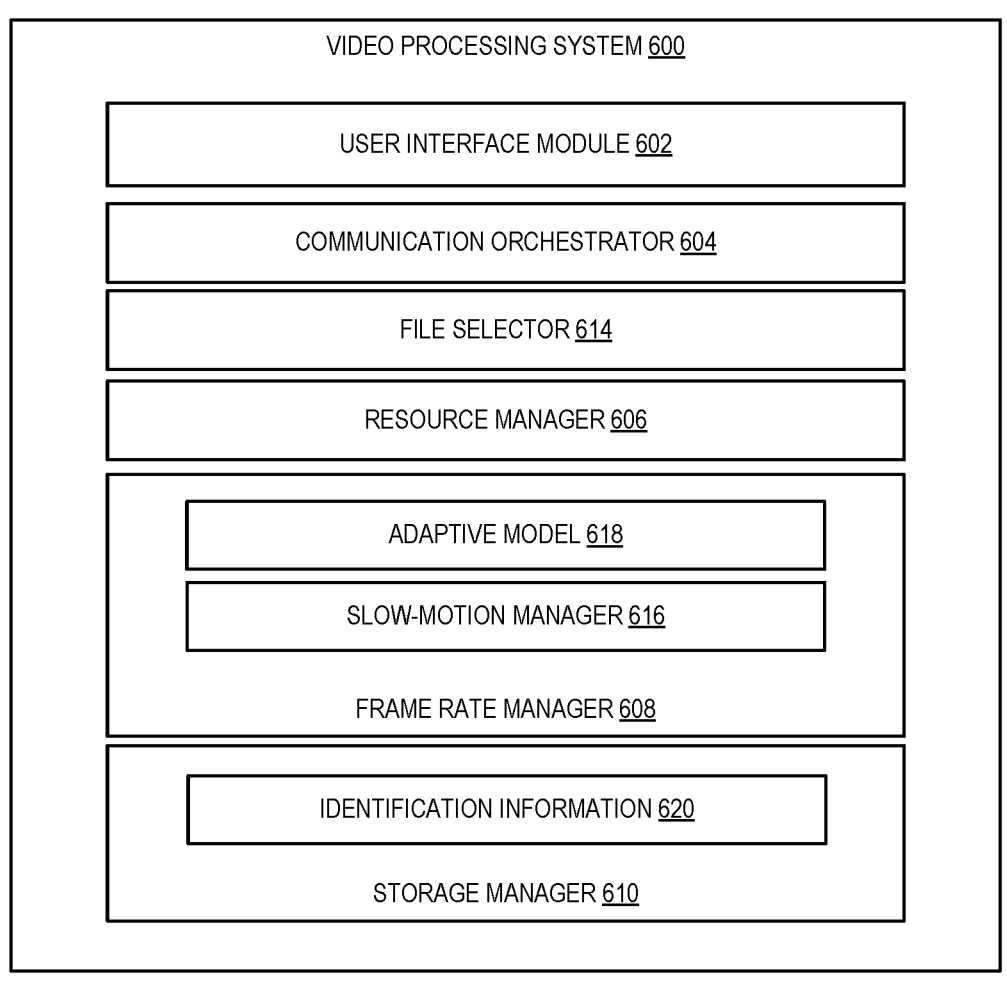
FIG. 6 illustrates a schematic diagram of video processing system in accordance with one or more embodiments.

FIG. 6 illustrates a schematic diagram of video processing system (e.g., "video processing system" described above) in accordance with one or more embodiments. As shown, the video processing system 600 may include, but is not limited to, a user interface module 602, a communication orchestrator 604, a file selector 614, a resource manager 606, a frame rate manager 608, and a storage manager 610.

As illustrated in FIG. 6, the video processing system 600 includes a user interface manager 602. For example, the user interface manager 602 allows users to input a desired frame rate at which a video is to be slowed, a selection of a video to be slowed, upload a video to be slowed, and the like. In some embodiments, the user interface manager 602 provides a user interface through which the user can upload the video to be slowed, as discussed above. Alternatively, or additionally, the user interface may enable the user to download the images from a local or remote storage location (e.g., by providing an address (e.g., a URL or other endpoint) associated with an image source). In some embodiments, the user interface can enable a user to link an image capture device, such as a camera or other hardware to capture image data and provide it to the video processing system 600.

As illustrated in FIG. 6, the video processing system 600 includes a communication orchestrator 604. The communication orchestrator 604 communicates with a server using APIs, for instance. In some embodiments, the communication orchestrator 604 communicates with other systems (e.g., memory) of a device hosting the video processing system 600. The communication orchestrator 604 requests information from the server and/or provides information to the server associated with a video input. For example, as described herein, the communication orchestrator 604 provides the uploaded/recorded video to the server, the communication orchestrator 604 requests one or more derivative video files associated with an uploaded video, the communication orchestrator 604 receives an indication of the one or more derivative video files associated with the uploaded video, the communication orchestrator 604 requests a specific derivative video file, and the communication orchestrator 604 receives the specific derivative video file.

As illustrated in FIG. 6, the video processing system 600 includes a file selector 614. The file selector 614 selects a derivative video file from a list of derivative video files. The selected derivative video file is the optimal video file for the computing device executing the video processing system 600 based on the available resources of the computing device and/or preconfigured mappings mapping the computing device to an optimal video file.

As illustrated in FIG. 6, the video processing system 600 includes a resource manager 606. In some embodiments, the communication orchestrator 604 queries the resource manager 606 for available resources such as available memory, available power, and the like. In some embodiments, the resource manager 606 periodically updates the communication orchestrator 604 with available resources. In some embodiments, the resource manager 606 also provides, to the communication orchestrator 604, total resource information, resource limitation information, and the like. For example, a resource limitation may be the refresh rate of a display coupled to a computing device executing the video processing system 600. The refresh rate of the display indicates the maximum frame rate that can be displayed in a visually aesthetic manner.

The resource manager 606 can poll one or more upstream and/or downstream systems to determine power usage, memory usage, and the like. The resource manager 606 can determine available resources by taking a difference using the resource usage information and a total resource of the computing device executing the video processing system 600.

As illustrated in FIG. 6, the video processing system 600 includes a frame rate manager 608. The frame rate manager 608 executes the adaptive model 618 to determine the playback frame rate of the source video. The adaptive model 618 is executed to decouple the source video frame rate from a playback frate rate. The frame rate manager 608 executes the adaptive model 618 using the original video frame rate, the derivative video frame rate (e.g., the source video frame rate), and a desired frame rate.

As shown, the frame rate manager 608 includes a slow-motion manager 616. The slow-motion manager 616 slows a source video at the determined playback speed. By slowing down the source video (which is a derivative video that has a lesser frame rate, lesser bit depth, smaller file size, etc.), the slow-motion manager 616 is able to play the source video at a lesser frame rate that effectively converts the source video into a slow-motion video.

As illustrated in FIG. 6, the video processing system 600 also includes the storage manager 610. The storage manager 610 maintains data for the video processing system 600. The storage manager 610 can maintain data of any type, size, or kind as necessary to perform the functions of the video processing system 600. The storage manager 610, as shown in FIG. 6, includes identification information 620. Identification information 620 identifies the computing device executing the video processing system 600 and/or the platform hosting the video processing system 600. For example, identification information can include an IP address, a phone number, a serial number, and the like.

Each of the components 602-610 of the video processing system 600 and their corresponding elements (as shown in FIG. 6) may be in communication with one another using any suitable communication technologies. It will be recognized that although components 602-610 and their corresponding elements are shown to be separate in FIG. 6, any of components 602-610 and their corresponding elements may be combined into fewer components, such as into a single facility or module, divided into more components, or configured into different components as may serve a particular embodiment.

The components 602-610 and their corresponding elements can comprise software, hardware, or both. For example, the components 602-610 and their corresponding elements can comprise one or more instructions stored on a computer-readable storage medium and executable by processors of one or more computing devices. When executed by the one or more processors, the computer-executable instructions of the video processing system 600 can cause a client device and/or a server device to perform the methods described herein. Alternatively, the components 602-610 and their corresponding elements can comprise hardware, such as a special purpose processing device to perform a certain function or group of functions. Additionally, the components 602-610 and their corresponding elements can comprise a combination of computer-executable instructions and hardware.

Furthermore, the components 602-610 of the video processing system 600 may, for example, be implemented as one or more stand-alone applications, as one or more modules of an application, as one or more plug-ins, as one or more library functions or functions that may be called by other applications, and/or as a cloud-computing model. Thus, the components 602-610 of the video processing system 600 may be implemented as a stand-alone application, such as a desktop or mobile application. Furthermore, the components 602-610 of the video processing system 600 may be implemented as one or more web-based applications hosted on a remote server. Alternatively, or additionally, the components of the video processing system 600 may be implemented in a suite of mobile device applications or "apps."

FIGS. 1-6, the corresponding text, and the examples, provide a number of different systems and devices that allows a user to view coherent slow-motion video displayed across multiple devices. In addition to the foregoing, embodiments can also be described in terms of flowcharts comprising acts and steps in a method for accomplishing a particular result. For example, FIG. 7 illustrates a flowchart of an exemplary method in accordance with one or more embodiments. The method described in relation to FIG. 7 may be performed with fewer or more steps/acts or the steps/acts may be performed in differing orders. Additionally, the steps/acts described herein may be repeated or performed in parallel with one another or in parallel with different instances of the same or similar steps/acts.

FIG. 7 illustrates a flowchart 700 of a series of acts in a method of displaying slow-motion videos in accordance with one or more embodiments. In one or more embodiments, the method 700 is performed in a digital medium environment that includes the video processing system 600.

The method 700 is intended to be illustrative of one or more methods in accordance with the present disclosure and is not intended to limit potential embodiments. Alternative embodiments can include additional, fewer, or different steps than those articulated in FIG. 7.

As illustrated in FIG. 7, the method 700 includes an act 702 of receiving one or more indications corresponding to one or more derivative video files, each derivative video file of the one or more derivative video files having a different frame rate. As described herein, a server is configured to generate derivative video files associated with an original video. A derivative video file includes derivative videos that are a representation of the original video using a smaller video file. The derivative videos can differ from the captured (otherwise referred to herein as "original") video in terms of video file size, video frame rate, video color space, video bit depth, video codec-type, and the like. The server generates the derivative video file using any suitable mechanism such as transcoding the original video into a video with a lesser frame rate, lesser bit rate, smaller file size, etc. The file size and/or frame rate of each of the generated derivative videos of the derivative video files may be predetermined. For example, for each received original video, the server generates a derivative video file including a derivative video at 120 fps, a derivative video file including a derivative video at 60 fps, a derivative video file including a derivative video at 30 fps, and the like. The server transmits an indication of each derivative video file associated with the original video file. For example, the server transmits a list including each of the file sizes of the derivative files, each of the frame rates of the derivative files, and the like.

As illustrated in FIG. 7, the method 700 includes an act 704 of selecting an indication of a derivative video file with a corresponding derivative video frame rate. As described herein, in some embodiments, a derivative video file is selected from a list of derivative video files according to a preconfigured mapping. For example, a computing device executing the video processing system is mapped to a particular optimal derivative video file. Similarly, a platform hosting the video processing system is mapped to a different particular optimal derivative video file. In other embodiments, the derivative video file is selected from a list of derivative video files according to available resources in the computing device.

As illustrated in FIG. 7, the method 700 includes an act 706 of receiving the derivative video file and an original video frame rate. The computing device receives, from the server, the selected derivative video file including the derivative video. As described herein, the selected derivative video becomes the video that is slowed down, or the source video. Additionally, the computing device receives, from the server, the original video frame rate.

As illustrated in FIG. 7, the method 700 includes an act 708 of determining a playback frame rate to slow a derivative video of the derivative video file using a desired frame rate, the derivative video frame rate, and the original video frame rate. As described herein, the computing device determines the playback frame rate according to Equation (1) reproduced below:

$$\text{Playback } fps = \text{Desired } fps \left( \frac{\text{source file } fps}{\text{original file } fps} \right) \quad (1)$$

As illustrated in FIG. 7, the method 700 includes an act 710 of displaying the derivative video at the determined playback frame rate. As described herein, the apparent rate of motion is the displayed movement/motion of the subject matter captured in the video. In other words, the apparent rate of motion is the human interpretation of the motion of content captured in the video. The apparent rate of motion is created by slowing down a source video at a determined playback frame rate. The determined playback frame rate results in a slowed video whose apparent rate of motion of subject matter matches the apparent rate of motion of subject matter of the original video regardless of whether or not the frame rate of the source video and the original video match. The computing device slows the source video at the determined playback speed. By slowing down the source video (which is a derivative video that has a lesser frame rate, lesser bit depth, smaller file size, etc.), the computing device is able to play the source video at a lesser frame rate that effectively converts the source video into a slow-motion video.

Figure 8:
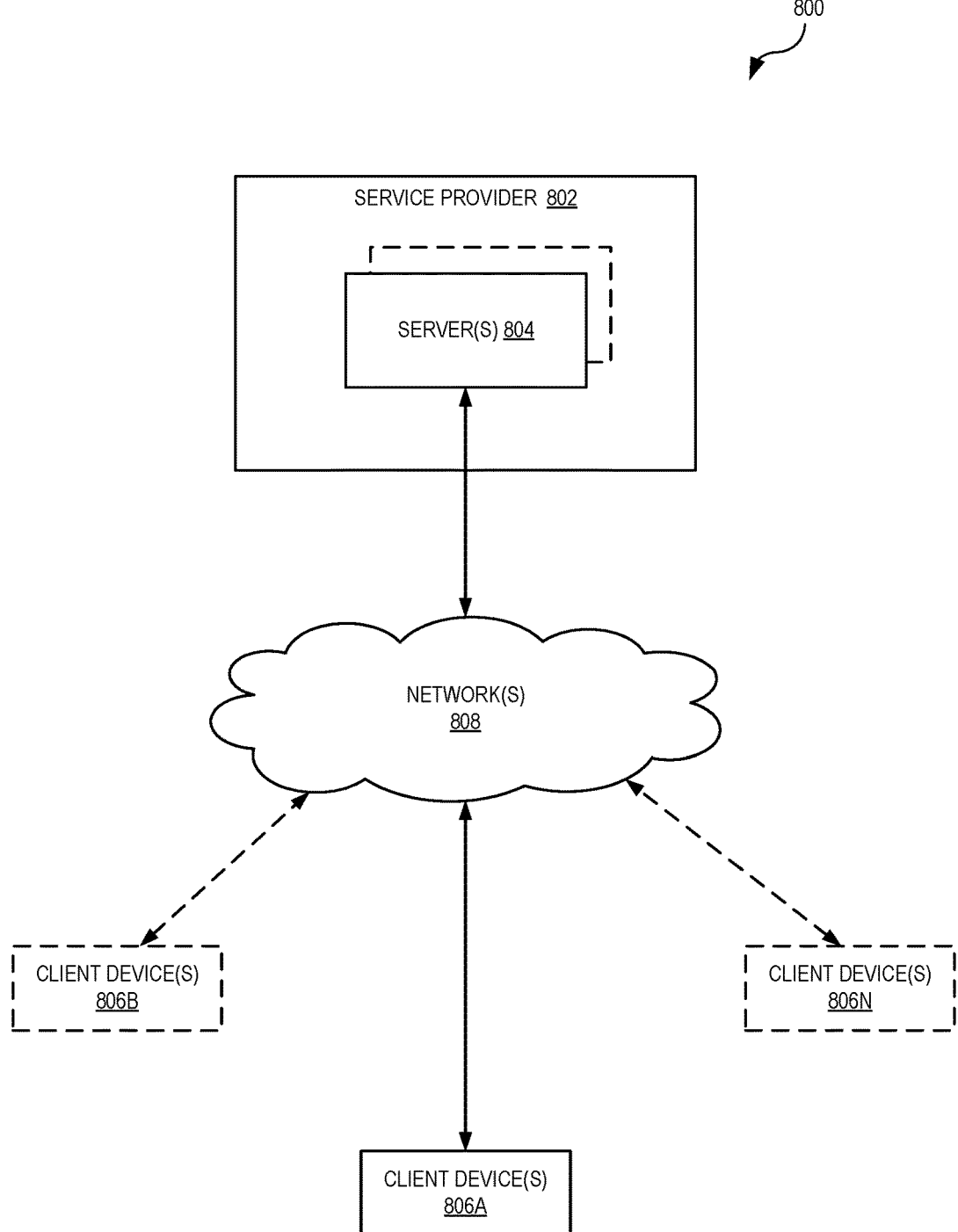
FIG. 8 illustrates a schematic diagram of an exemplary environment in which the video processing system can operate in accordance with one or more embodiments.

FIG. 8 illustrates a schematic diagram of an exemplary environment 800 in which the video processing system 600 can operate in accordance with one or more embodiments. In one or more embodiments, the environment 800 includes a service provider 802 which may include one or more servers 804 connected to a plurality of client devices 806A-806N via one or more networks 808. The client devices 806A-806N, the one or more networks 808, the service provider 802, and the one or more servers 804 may communicate with each other or other components using any communication platforms and technologies suitable for transporting data and/or communication signals, including any known communication technologies, devices, media, and protocols supportive of remote data communications, examples of which will be described in more detail below with respect to FIG. 9.

Although FIG. 8 illustrates a particular arrangement of the client devices 806A-806N, the one or more networks 808, the service provider 802, and the one or more servers 804, various additional arrangements are possible. For example, the client devices 806A-806N may directly communicate with the one or more servers 804, bypassing the network 808. Or alternatively, the client devices 806A-806N may directly communicate with each other. The service provider 802 may be a public cloud service provider which owns and operates their own infrastructure in one or more data centers and provides this infrastructure to customers and end users on demand to host applications on the one or more servers 804. The servers may include one or more hardware servers (e.g., hosts), each with its own computing resources (e.g., processors, memory, disk space, networking bandwidth, etc.) which may be securely divided between multiple customers, each of which may host their own applications on the one or more servers 804. In some embodiments, the service provider may be a private cloud provider which maintains cloud infrastructure for a single organization. The one or more servers 804 may similarly include one or more hardware servers, each with its own computing resources, which are divided among applications hosted by the one or more servers for use by members of the organization or their customers.

Similarly, although the environment 800 of FIG. 8 is depicted as having various components, the environment 800 may have additional or alternative components. For example, the environment 800 can be implemented on a single computing device with the video processing system 600. In particular, the video processing system 600 may be implemented in whole or in part on the client device 802A.

As illustrated in FIG. 8, the environment 800 may include client devices 806A-806N. The client devices 806A-806N may comprise any computing device. For example, client devices 806A-806N may comprise one or more personal computers, laptop computers, mobile devices, mobile phones, tablets, special purpose computers, TVs, or other computing devices, including computing devices described below with regard to FIG. 9. Although three client devices are shown in FIG. 8, it will be appreciated that client devices 806A-806N may comprise any number of client devices (greater or smaller than shown).

Moreover, as illustrated in FIG. 8, the client devices 806A-806N and the one or more servers 804 may communicate via one or more networks 808. The one or more networks 808 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 808 may be any suitable network over which the client devices 806A-806N may access service provider 802 and server 804, or vice versa. The one or more networks 808 will be discussed in more detail below with regard to FIG. 9.

In addition, the environment 800 may also include one or more servers 804. The one or more servers 804 may generate, store, receive, and transmit any type of data, including derivative video files including derivative videos, user preferences, desired frame rates, user profiles, user sub-profiles, or other information. For example, a server 804 may receive data from a client device, such as the client device 806A, and send the data to another client device, such as the client device 802B and/or 802N. The server 804 can also transmit electronic messages between one or more users of the environment 800. In one example embodiment, the server 804 is a data server. The server 804 can also comprise a communication server or a web-hosting server. Additional details regarding the server 804 will be discussed below with respect to FIG. 9.

As mentioned, in one or more embodiments, the one or more servers 804 can include or implement at least a portion of the video processing system 600. In particular, the video processing system 600 can comprise an application running on the one or more servers 804 or a portion of the video processing system 600 can be downloaded from the one or more servers 804. For example, the video processing system 600 can include a web hosting application that allows the client devices 806A-806N to interact with content hosted at the one or more servers 804. To illustrate, in one or more embodiments of the environment 800, one or more client devices 806A-806N can access a webpage supported by the one or more servers 804. In particular, the client device 806A can run a web application (e.g., a web browser) to allow a user to access, view, and/or interact with a webpage or website hosted at the one or more servers 804.

Upon the client device 806A accessing a webpage or other web application hosted at the one or more servers 804, in one or more embodiments, the one or more servers 804 can provide access to a user interface including a collection of stored videos on the one or more servers 804. Response to receiving user input at the client device 806A selecting a particular video to be slowed down, the client device 806 transmits a content identifier associated with the selected video to the one or more servers 804. Upon receiving the content identifier, the one or more servers 804 determine derivative video files associated with the video assigned the content identifier. Subsequently, the one or more servers 804 transmit a list, log, or other data structure identifying the generated one or more derivative video files associated with the selected video. The client device 806 selects a derivative video file with a derivative video frame rate and/or file size that is optimal for the client device 806 based on administrative settings mapping the client device 806 to the derivative video file. The client device 806 transmits the requested derivative video file to the one or more servers 804, which respond with a message including the derivative video file and a frame rate of the original video (e.g., the frame rate associated with the selected video to be slowed down). Upon receiving the derivative video file including the derivative video at a derivative video frame rate, and the original video frame rate, the client device 806A automatically performs the methods and processes described above to identify a playback frate rate which will slow down the derivative video to an apparent rate of motion that is consistent across any device displaying the slowed down source video. For example, the apparent rate of motion of the content captured in the slowed down video displayed at the client device 806A matches the apparent rate of motion of the content in the slowed down video displayed at client device 806B.

As just described, the video processing system 600 may be implemented in whole, or in part, by the individual elements 802-808 of the environment 800. It will be appreciated that although certain components of the video processing system 600 are described in the previous examples with regard to particular elements of the environment 800, various alternative implementations are possible. For instance, in one or more embodiments, the video processing system 600 is implemented on any of the client devices 806A-N. Similarly, in one or more embodiments, the video processing system 600 may be implemented on the one or more servers 804. Moreover, different components and functions of the video processing system 600 may be implemented separately among client devices 806A-806N, the one or more servers 804, and the network 808.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other non-transitory storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
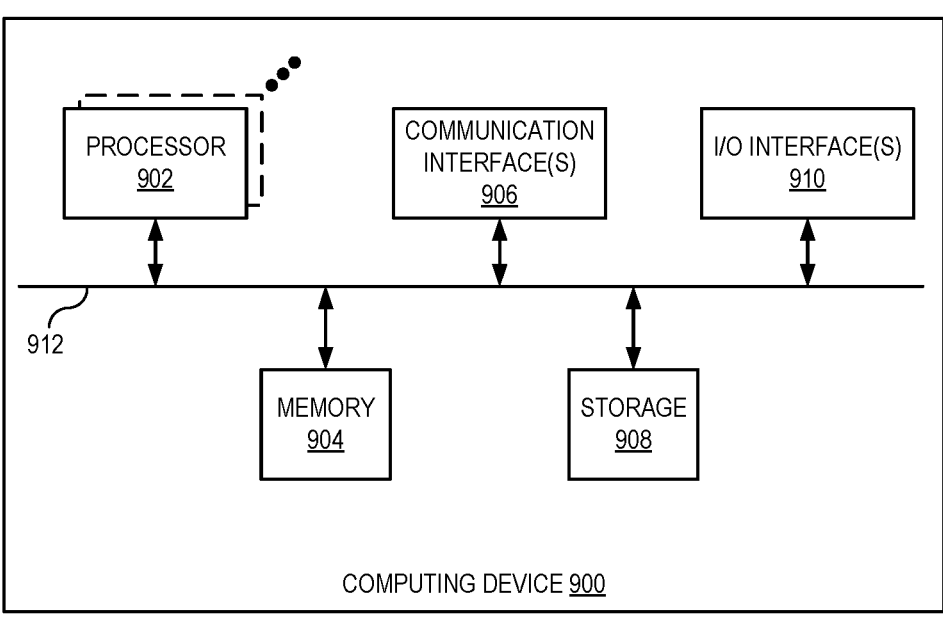
FIG. 9 illustrates a block diagram of an exemplary computing device in accordance with one or more embodiments.

FIG. 9 illustrates, in block diagram form, an exemplary computing device 900 that may be configured to perform one or more of the processes described above. One will appreciate that one or more computing devices such as the computing device 900 may implement the video processing system. As shown by FIG. 9, the computing device can comprise a processor 902, memory 904, one or more communication interfaces 906, a storage device 908, and one or more I/O devices/interfaces 910. In certain embodiments, the computing device 900 can include fewer or more components than those shown in FIG. 9. Components of computing device 900 shown in FIG. 9 will now be described in additional detail.

In particular embodiments, processor(s) 902 includes hardware for executing instructions, such as those making up a computer program. As an example, and not by way of limitation, to execute instructions, processor(s) 902 may retrieve (or fetch) the instructions from an internal register, an internal cache, memory 904, or a storage device 908 and decode and execute them. In various embodiments, the processor(s) 902 may include one or more central processing units (CPUs), graphics processing units (GPUs), field programmable gate arrays (FPGAs), systems on chip (SoC), or other processor(s) or combinations of processors.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The computing device 900 can further include one or more communication interfaces 906. A communication interface 906 can include hardware, software, or both. The communication interface 906 can provide one or more interfaces for communication (such as, for example, packet-based communication) between the computing device and one or more other computing devices 900 or one or more networks. As an example and not by way of limitation, communication interface 906 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can comprise hardware, software, or both that couples components of computing device 900 to each other.

The computing device 900 includes a storage device 908 includes storage for storing data or instructions. As an example, and not by way of limitation, storage device 908 can comprise a non-transitory storage medium described above. The storage device 908 may include a hard disk drive (HDD), flash memory, a Universal Serial Bus (USB) drive or a combination these or other storage devices. The computing device 900 also includes one or more input or output ("I/O") devices/interfaces 910, which are provided to allow a user to provide input to (such as user strokes), receive output from, and otherwise transfer data to and from the computing device 900. These I/O devices/interfaces 910 may include a mouse, keypad or a keyboard, a touch screen, camera, optical scanner, network interface, modem, other known I/O devices or a combination of such I/O devices/interfaces 910. The touch screen may be activated with a stylus or a finger.

The I/O devices/interfaces 910 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 910 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
receiving one or more indications corresponding to one or more derivative video files, each derivative video file of the one or more derivative video files having a different frame rate and a corresponding different apparent rate of motion;
selecting an indication of a derivative video file with a corresponding derivative video frame rate;
receiving the derivative video file and an original video frame rate corresponding to an original apparent rate of motion;
determining a playback frame rate to slow a derivative video of the derivative video file using a combination of a desired frame rate, the derivative video frame rate, and the original video frame rate; and
displaying the derivative video at a slowed apparent rate of motion using the determined playback frame rate, wherein the derivative video of the derivative video file has a set of one or more video properties different from the set of one or more video properties of an original video file, and wherein the set of one or more video properties comprises at least one of video file size, video color space, video bit depth, or video codec-type.

2. The method of claim 1, wherein displaying the derivative video at the original apparent rate of motion using the determined playback frame further comprises:
determining a second playback frame rate to slow a second derivative video of a second derivative video file of the one or more derivative video files using the desired frame rate, a second derivative video frame rate, and the original video frame rate; and
displaying the second derivative video at the second determined playback frame rate, wherein displaying the second derivative video at the second determined playback frame rate causes display of the original apparent rate of motion.

3. The method of claim 1, wherein selecting the indication of the derivative video file with the corresponding derivative video frame rate further comprises:
determining an available computing resource; and
selecting the indication of the derivative video file based on the available computing resource.

4. The method of claim 1, wherein selecting the indication of the derivative video file with the corresponding derivative video frame rate is based on at least one of a computing device identifier or a platform identifier.

5. The method of claim 1, further comprising:
transmitting the indication of the derivative video file.

6. The method of claim 5, wherein the transmitted indication includes identification information identifying at least one of a user profile, a computing device identifier, or a platform identifier.

7. The method of claim 1, further comprising:
receiving the desired frame rate as a user input.

8. A system comprising:
a memory component; and
a processing device coupled to the memory component, the processing device to perform operations comprising:
receiving one or more indications corresponding to one or more derivative video files, each derivative video file of the one or more derivative video files having a different frame rate and a corresponding different apparent rate of motion;

selecting an indication of a derivative video file with a corresponding derivative video frame rate;

receiving the derivative video file and an original video frame rate corresponding to an original apparent rate of motion;

determining a playback frame rate to slow a derivative video of the derivative video file using a combination of a desired frame rate, the derivative video frame rate, and the original video frame rate; and displaying the derivative video at a slowed apparent rate of motion using the determined playback frame rate, wherein the derivative video of the derivative video file has a set of one or more video properties different from the set of one or more video properties of an original video file, and wherein the set of one or more video properties comprises at least one of video file size, video color space, video bit depth, or video codec-type.

9. The system of claim 8, wherein selecting the indication of the derivative video file with the corresponding derivative video frame rate further comprises:

determining an available computing resource; and selecting the indication of the derivative video file based on the available computing resource.

10. The system of claim 8, wherein selecting the indication of the derivative video file with the corresponding derivative video frame rate is based on at least one of a computing device identifier or a platform identifier.

11. The system of claim 8, wherein the processing device performs further operations comprising:

transmitting the indication of the derivative video file.

12. The system of claim 11, wherein the transmitted indication includes identification information identifying at least one of a user profile, a computing device identifier, or a platform identifier.

13. The system of claim 8, wherein the processing device performs further operations comprising:

receiving the desired frame rate as a user input.

14. The system of claim 13, wherein the processing device performs further operations comprising:

transmitting the desired frame rate associated with a user profile.

15. A method comprising:

receiving, by a first device, a first video file including a first video with a first frame rate, wherein the first video is a first derivative video of an original video with a first apparent rate of motion;

determining, by the first device, a first playback frame rate using a combination of a desired frame rate, the first frame rate, and an original video frame rate associated with the original video;

displaying, by the first device, a first slow video at an original apparent rate of motion at the desired frame rate using the first video, wherein the first slow video is displayed at the first playback frame rate;

receiving, by a second device, a second video file including a second video with a second frame rate, wherein the second video is a second derivative video of the original video with a second apparent rate of motion, wherein the second derivative video has a set of one or more video properties different from the set of one or more video properties of the first video file, and wherein the set of one or more video properties comprises at least one of video file size, video color space, video bit depth, or video codec-type;

determining, by the second device, the second playback frame rate using a combination of the desired frame rate, the second frame rate, and the original video frame rate associated with the original video; and displaying, by the second device, a second slow video at the original apparent rate of motion at the desired frame rate using the second video, wherein the second slow video is displayed at the second playback frame rate.

16. The method of claim 15, further comprising:

receiving, by the first device and the second device, one or more indications corresponding to one or more video files, each video file of the one or more video files having a different frame rate;

selecting, by the first device, a first video file based on a mapping of the first device to a first file size; and selecting, by the second device, a second video file based on a mapping of the second device to a second file size.

17. The method of claim 15, further comprising:

receiving, by a third device, a third video file including a third video with a third frame rate, wherein the third video and the second video and the first video are derivative videos of the original video; and displaying, by the third device, a third slow video at a second desired frame rate using the third video, wherein the third slow video is displayed at a third playback frame rate.

18. The method of claim 17, further comprising:

determining, by the third device, the third playback frame rate using the second desired frame rate, the third frame rate, and an original video frame rate associated with the original video.

19. The method of claim 15, further comprising:

receiving, at the first device, an update to the desired frame rate at the second device;

determining, by the second device, a third playback frame rate using the updated desired frame rate, the second frame rate, and the original video frame rate associated with the original video; and displaying, by the second device, the second slow video at the updated desired frame rate using the second video, wherein the second slow video is displayed at the third playback frame rate.

20. The method of claim 15, further comprising:

selecting the first video with the first frame rate based on a mapping of the first device to the first frame rate or resources of the first device; and selecting the second video with the second frame rate based on a mapping of the second device to the first frame rate or resources of the second device.

* * * * *